C. W. GRAHAM.
CAN TESTING MACHINE.
APPLICATION FILED FEB. 19, 1907.

970,621.

Patented Sept. 20, 1910.

3 SHEETS—SHEET 1.

WITNESSES
INVENTOR
C. W. Graham
BY
ATTORNEYS

C. W. GRAHAM.
CAN TESTING MACHINE.
APPLICATION FILED FEB. 19, 1907.

970,621.

Patented Sept. 20, 1910.
3 SHEETS—SHEET 2.

WITNESSES

INVENTOR
C. W. Graham
BY
Duell, _____ & Duell
ATTORNEYS

C. W. GRAHAM.
CAN TESTING MACHINE.
APPLICATION FILED FEB. 19, 1907.
970,621.
Patented Sept. 20, 1910.
3 SHEETS—SHEET 3.
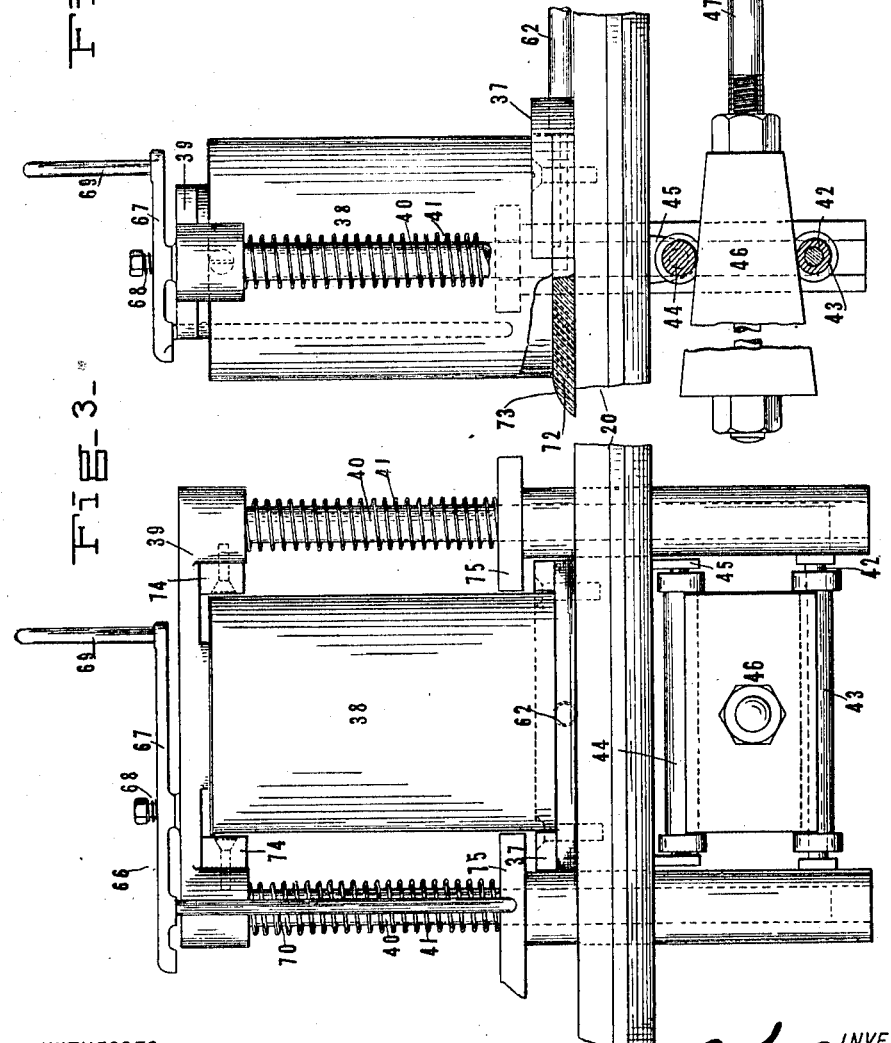

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

CAN-TESTING MACHINE.

970,621. Specification of Letters Patent. Patented Sept. 20, 1910.

Application filed February 19, 1907. Serial No. 358,319.

*To all whom it may concern:*

Be it known that I, CHARLES W. GRAHAM, residing at Rome, in the county of Oneida and State of New York, have invented certain new and useful Improvements in Can-Testing Machines, of which the following is a full, clear, and exact description, such as will enable others skilled in the art to which it appertains to make and use the same.

This invention relates to machinery for testing cans and the like.

One of the objects thereof is to provide an efficient and practical machine for the determination of the integrity of can bodies and the like.

Another object is to provide a machine of the above type of a readily adjustable character.

Another object is to provide compact and readily manipulated driving mechanism suited for use in machinery of the above nature.

Another object is to provide valve mechanism of a durable and non-complicated character adapted for the economical use of air or other fluid in connection with a machine of the first mentioned character.

Another object is to provide efficient can-holding means of automatic and dependable action.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
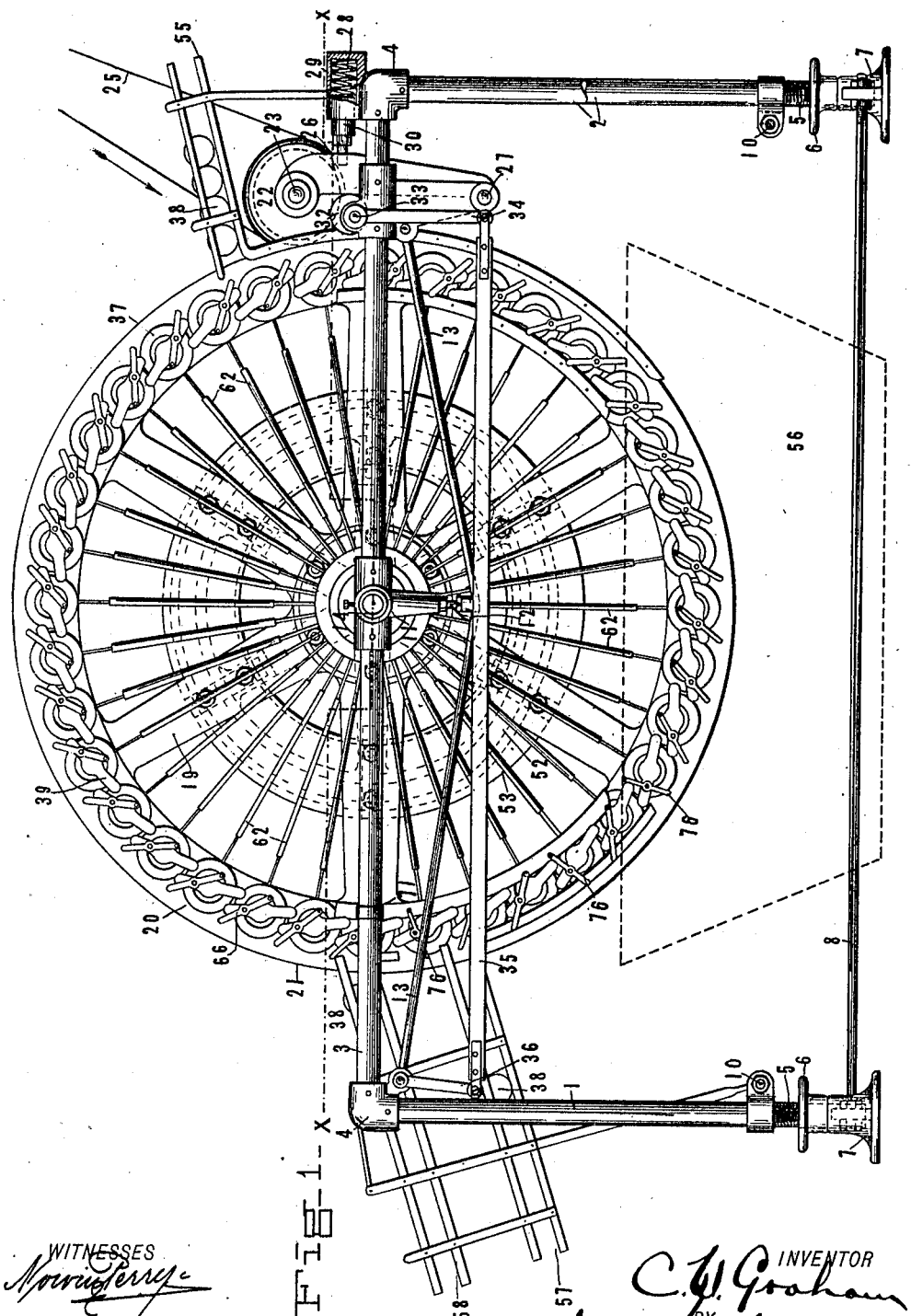
Figure 2:
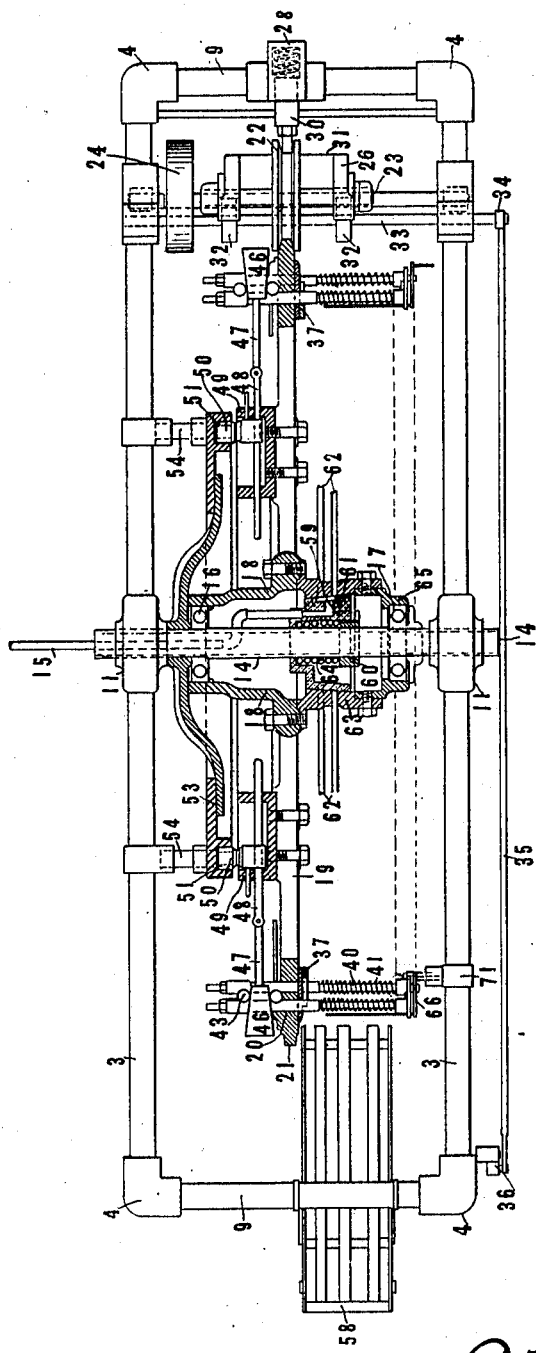

In the accompanying drawings, wherein is set forth one of various possible embodiments of my invention, Figure 1 is a side elevation thereof; Fig. 2 is a sectional plan, certain parts being omitted in order to show the construction more clearly and the section being taken substantially on the line *x—x* of Fig. 1; Fig. 3 is a detail plan of can clamping means and parts associated therewith; Fig. 4 is a similar view of these parts taken in another direction.

Similar reference characters refer to similar parts throughout the several views of the drawings.

In order that certain features and aims of this invention may be the more readily understood, it may here be noted that in connection with apparatus of the nature of that with which this invention deals, accurate and reliable control of speed or the continuity of the drive are of a high degree of importance. It may also be noted that simplicity of construction and positiveness of action are prerequisites to the rapid and reliable operation of the machine, as otherwise the failure of some part of the mechanism is usually attendant upon any attempt to gain a high speed of working. The above and other advantages are attained in constructions of the nature of that hereinafter described.

Referring now to Fig. 1 of the accompanying drawings, there is shown a frame comprising the uprights or posts 1 and 2 longitudinally connected in pairs, as by the rails 3, these parts being preferably formed of piping and secured within the elbow fittings 4. Vertical adjustment of the several posts and the parts mounted thereon is attained, as by means of the jack screws 5 controlled by hand wheels 6 mounted in the bases 7. The latter members are adjustably connected in a longitudinal direction by the tie-rods 8, and the entire side frames are connected transversely by the piping 9 and tie-rods 10.

It may here be noted that by the substitution of piping of various lengths for the rails 3 and the cross-members 9 the dimensions of the frame may be adjusted in any direction and the lower parts held in alined position by the several adjustable tie-rods.

Mounted upon each rail 3 is a fitting 11 provided with a screw 12 which takes against a truss rod 13 and thus stiffens the rails in a vertical plane and better enables them to support the parts mounted thereon. Within fittings 11 is a hollow shaft 14 through which is led a conduit 15 for a purpose hereinafter described. Journaled upon shaft 14, as by the ball bearings 16 and 17, is the hub of a casting 18 provided with spokes 19 and an outer rim 20, as best shown in Fig. 2 of the drawings.

Casting or wheel 18 is provided with a tapered outer edge 21 adapted to fit within a recessed pulley 22 and receive power therefrom by a frictional form of drive. Pulley 22 is mounted upon the shaft 23 provided with a pulley 24 driven as by the belt 25. Shaft 23 is journaled in arms 26 in such manner as to swing about the pivot 27, and is urged toward the wheel rim, as by a spring 28 compressed within a cylinder 29 and engaging, through the piston 30, a cross bar 31 connecting the swinging arms 26. The continuity as well as the rate of drive is controlled by a swinging of the driving shaft 23 about the pivot 27 by means of a cam 32 upon a shaft 33. The latter member is actuated through a lever 34 having pivoted to its lower end a rail 35 supported preferably in a substantially horizontal position by a link 36 at the opposite end of the frame. In this manner instant control of the drive of the wheel 18 is attained from any position at the side of the machine by a mere shifting of the rail 35.

Formed upon the rim 20 are a series of pockets 37, best shown in Fig. 3 of the drawings, of such conformation as to be adapted to receive the end of a can 38. The outer end of the can lies under a cross head or abutment 39 fast upon the sliding guide rods 40 and normally held in its outermost position, as by the springs 41 coiled about these rods. Upon the further side of the rim the rods 40 are connected by a pin 42 provided with a flanged anti-friction roller 43 disposed opposite a similar roller 44 mounted, as by the lugs 45, upon the rear surface of the wheel rim. The sliding of the cross head 39 with a subsequent clamping of the can 38 positioned beneath the same as hereinafter described is brought about by a wedge 46 fitting between the rollers 43 and 44 and adjustably mounted upon a link 47. The latter member is pivoted to a rod 48 held in an annular casting 49 bolted to the rear surface of the wheel 18 and is provided with a pin 50, the roller 51 mounted upon which takes within the groove 52 of a cam 53 rigidly held upon the frame of the machine as at 54.

Recurring now to Fig. 1 of the drawings, there is shown a supply chute 55 through which the cans are discharged between the several pockets 37 and the corresponding outer jaws or cross heads 39. Upon a can being fed into this position, the corresponding cross head is forced down upon the outer end of the same and securely clamps it within the pocket, the cam groove 52 being of such conformation as to cause this action at the desired time. The can bodies are then led through a tank 56 for a purpose hereinafter described, and are released by the cross heads and discharged into either chute 57 or 58.

Conduit 15, above referred to, which preferably leads from a source of compressed air or other fluid, terminates within a valve 59 held against rotation, as by the fitting 60 fast upon the shaft 14. Valve 59 is provided with a port 61 extending about the lower portion of the circumference thereof and adapted to co-act with tubes 62 positioned in the conical valve seat 63 and preferably disposed in staggered relation in order to avoid crowding at this point. It may here be noted that the valve 59, although held from rotation as above set forth, is slidably mounted upon the shaft 14 and is urged, as by the spiral spring 64, so as to form a tight fit within its seat. The outer or forward end of the valve seat 63, which forms in effect an extension of the hub of wheel 18, is provided with a collar 65 to form the bearing 17 as above described.

The several tubes 62 lead radially to a point within the corresponding pockets 37, as is best indicated in Fig. 4 of the drawings, and, upon a can being clamped in position above the same and compressed air admitted thereto from the valve 59, are adapted to force air within the corresponding can through the small opening left in one end thereof for filling purposes, and thus develop therein any desired degree of air pressure.

The conformation and disposition of the port 61 as well as that of the cam groove 52 are so related one to another and to the remaining elements of the machine as, upon a can passing beneath a cross head 39, first to clamp the same securely within the pocket 37 and then to admit the compressed air to the interior thereof. The can is then led through the tank 56, preferably filled with water or other fluid, and any leak in the can body or any of the joints thereof is immediately evidenced by the bubbles arising therefrom through the water due to the escape of the compressed air.

For the purpose of segregating the defective from the sound cans, there are provided locks 66 which comprise levers 67 pivotally mounted upon the cross heads 39 and forced into frictional engagement therewith, as by springs 68. Each of these levers is provided at one end with an outwardly directed pin 69 and at the opposite end with an inwardly disposed pin 70, the latter being normally out of the path of the can in such manner as to permit it, upon its release by the cross head, to be discharged into the chute 57, but upon being swung by the lever 67 to obstruct the passage of the can. The lever, if thrown into locking position, is returned into its normal position by the engagement of the pin 69 with an abutment 71 mounted upon the rail 3 and the leaky can is set free upon its arrival at the discharge chute 58.

It may here be noted that in order to assure a tight joint between a can body and the pocket 37, the bottom 72 of the latter member is preferably formed of rubber or other resilient material, and is thus slightly compressed by the end of the can upon the latter being clamped in position. The outer edge of this member 72, moreover, is preferably curved as indicated at 73, in order to permit a ready entry and exit of the can body.

The correct positioning of the can between the clamping jaws is insured as by the removable guides 74 and 75, best shown in Fig. 3 of the drawings. These members may be quickly detached to permit of the insertion of a can body of larger size, and if desired may be replaced with guides of other size or shape, in order to adapt the machine for various types of cans.

The operation of the above-described embodiment of my invention is substantially as follows: Assuming the cans to be continuously fed beneath the cross heads 39 from the chute 55, the same are carried through the water in tank 56, and in the event of bubbles arising therefrom the levers 67 are thrown by an attendant into the position indicated at 76. The cans are then raised from the water, the air pressure cut off by reason of the corresponding tubes 62 passing out of operative relation to the port 61, and the cross heads are retracted by the springs 41 as the wedges 46 are thrown outwardly by the cam 53. The sound cans are then discharged by gravity into the chute 57 and any desired disposition made of the same. The cans which have been found defective, however, are held by the pins 70 from passing into the chute 57, but upon these pins being thrown into their normal position by the swinging of levers 67 by abutment 71, the cans are dropped into the chute 58 and are thus segregated, for patching, from the perfect cans. This cycle of operations is continuous and is entirely automatic except in that an attendant is required to throw the levers 67 upon the bubbles indicating a defective can.

It will thus be seen that I have provided apparatus in which the several objects of my invention are achieved and the advantages hereinbefore mentioned are, among others, inherent. The machine may be instantly stopped or its speed varied to any desired degree from any part of the forward side thereof, as the rail 35 extends substantially from end to end of the frame and is thus within instant reach. The can bodies are positively clamped and securely held against leakage at their connection with the corresponding pockets. Leakage is also obviated at the valve by reason of the spring 64 holding the same securely upon its seat, and not only is the harmful effect of wear at this point done away with, but the same is turned to good account in grinding the meeting surfaces into a more perfect fit. The entire apparatus is adjustable, moreover, to cans of any length, as by the adjustment of the wedges 46, and cans of various diameters may be accommodated by the substitution of pockets of corresponding form. The entire frame, moreover, may be, if desired, adjustable, as above set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. In apparatus of the class described, in combination, a pair of members adapted to engage opposite ends of a can, one of said members being provided with means adapted to transmit a fluid to the can, an abutment adjacent which said last mentioned member is mounted, means connected with the other of said members, a wedge interposed between said means and said abutment, and means adapted to actuate said wedge to draw together said members.

2. In apparatus of the class described, in combination, a pair of members adapted to engage opposite ends of a can, one of said members being provided with means adapted to transmit a fluid to the can, an abutment adjacent which said last mentioned member is mounted, means connected with the other of said members, a wedge interposed between said means and said abutment, means adapted to actuate said wedge to draw together said members, and means comprising a spring tending to force said members apart.

3. In apparatus of the class described, in combination, a can-receiving member provided with means adapted to transmit a fluid to a can therein, a member adapted to engage the opposite end of said can and mounted to move toward and away from said first mentioned member, a spring tending to force apart said members, an abutment mounted adjacent said first mentioned member, a pair of rods leading from said second member beyond said abutment, a cross member connecting said rods adjacent said abutment, a wedge interposed between said abutment and said cross member, and means adapted to actuate said wedge to draw said second member toward said can-receiving member.

4. In apparatus of the class described, in combination, means comprising a rotary member adapted to receive cans and develop air pressure therein, a tank through which cans upon said means are carried, driving means adapted to make frictional connection with said rotary member, said driving means being mounted to swing toward and away from said rotary member, a spring mounted to urge said driving means toward said rotary member, means comprising a cam adapted to force said driving means in the opposite direction, a lever controlling said cam, and a member connected with said lever and mounted adjacent said tank.

5. In apparatus of the class described, in combination, means comprising a rotary member adapted to receive cans and develop air pressure therein, a tank through which cans upon said means are carried, driving means adapted to make frictional connection with said rotary member, said driving means being mounted to swing toward and away from said rotary member, a spring mounted to urge said driving means toward said rotary member, means comprising a cam adapted to force said driving means in the opposite direction, a lever controlling said cam, and a member connected with said lever and mounted adjacent said tank and extending substantially from end to end thereof.

6. In apparatus of the class described, in combination, a driven member having a tapered outer edge, a driving member having a recessed surface adapted to embrace and make frictional connection with said driven member, a shaft upon which said driving member is mounted, pivotally mounted means having journaled therein said shaft, spring actuated means engaging one side of said pivotally mounted means and adapted to urge said shaft toward said driven member, and a cam engaging said pivotally mounted means upon the opposite side and adapted to swing said shaft in the opposite direction.

7. In apparatus of the class described, in combination, a frame comprising four uprights and members connecting the same longitudinally and transversely in pairs at their upper ends, a bearing supported by said longitudinal member, rotary means mounted upon said bearing adjustable tie-rods connecting said uprights longitudinally and transversely in pairs at their lower ends, and means adapted to adjust the height of said upper connecting member.

8. In apparatus of the class described, in combination, a rotary member, a plurality of can-receiving members mounted thereon, means adapted automatically to clamp a can within each of said can-receiving members, a valve seat mounted to rotate with said first member, a plurality of conduits leading from said valve seat and terminating at each of said can-receiving members and adapted to transmit air to a can positioned therein, fluid supplying means, and a valve connected with said fluid supplying means fitting said seat and adapted to supply fluid to said conduits during a portion of the revolution of said first member, said conduits being mounted in staggered relation within said valve seat.

9. In apparatus of the class described, in combination, a rotary member, a plurality of can-receiving members mounted thereon, means adapted automatically to clamp a can within each of said can-receiving members, a valve seat mounted to rotate with said first member, a plurality of conduits leading from said valve seat and terminating at each of said can-receiving members and adapted to transmit air to a can positioned therein, fluid supplying means, a valve connected with said fluid supplying means fitting said seat and adapted to supply fluid to said conduits during a portion of the revolution of said first member, said conduits being mounted in staggered relation within said valve seat, said valve and valve seat being of conical conformation and fitting one within the other, and means comprising a spring adapted to urge said valve within said seat.

10. In apparatus of the class described, in combination, a pair of members adapted to engage opposite ends of a can, one of said members being provided with means adapted to transmit a fluid to a can positioned between the same, means adapted to cause a relative movement of said members in one direction, a rotary member upon which said first members are mounted, and a fixed cam operatively related to said last mentioned means and adapted to move the same positively in two directions.

11. In apparatus of the class described, in combination, a frame comprising a pair of longitudinally disposed substantially parallel members, a rotary member mounted thereon, a pair of members mounted upon said rotary member adapted to engage opposite ends of a can, means adapted to supply a fluid to a can positioned between said members, an abutment positioned adjacent one of said members, means connected with the other of said members and spaced from said abutment, a wedge between said last mentioned means and said abutment adapted upon movement to force the same apart and draw said can-engaging members toward one another, a stationary cam, and means connected with said wedge and operatively related to said cam adapted to be reciprocated thereby.

12. In apparatus of the class described, in combination, a frame comprising a pair of longitudinally disposed substantially parallel members, a rotary member mounted thereon, a pair of members mounted upon said rotary member adapted to engage opposite ends of a can, means adapted to supply a fluid to a can positioned between said members, an abutment positioned adjacent one of said members, means connected with the other of said members and spaced from said abutment, a wedge between said last mentioned means and said abutment adapted upon movement to force the same apart and draw said can-engaging members toward one another, a stationary cam, means connected with said wedge and operatively related to said cam adapted to be reciprocated thereby, and means adapted automatically to feed cans between said can-engaging members.

13. In apparatus of the class described, in combination, a frame comprising a pair of longitudinally disposed substantially parallel members, a rotary member mounted thereon, a driving member adapted to make frictional engagement with and drive said rotary member, a pair of arms mounted upon said frame members and adapted to swing with respect thereto, a shaft mounted within said arms and having mounted thereon said driving member, means comprising a spring tending to swing said arms toward said rotary member, means adapted to swing said arms in the opposite direction, and means controlling said last mentioned means and extending substantially throughout the length of said frame members.

14. In apparatus of the class described, in combination, a frame comprising a pair of longitudinally disposed substantially parallel members, a rotary member mounted thereon, a driving member adapted to make frictional engagement with and drive said rotary member, a pair of arms mounted upon said frame members and adapted to swing with respect thereto, a shaft mounted within said arms and having mounted thereon said driving member, means comprising a spring tending to swing said arms toward said rotary member, means adapted to swing said arms in the opposite direction, and means controlling said last mentioned means and extending substantially throughout the length of said frame members, said spring being mounted upon a cross member of said frame.

15. In apparatus of the class described, in combination, a frame comprising a pair of longitudinally disposed substantially parallel members, a hollow shaft mounted upon said frame members, a rotary member journaled upon said shaft, means mounted upon said rotary member adapted to receive cans, a valve seat mounted to turn with said rotary member, conduits leading from said valve seat to said can-receiving means, a valve mounted upon said shaft and co-acting with said valve seat to supply fluid to said conduits, a conduit leading through said hollow shaft to said valve, means adapted to clamp cans within said can-receiving means, a fixed cam mounted upon said frame, and means operatively related to said cam adapted to actuate said clamping means.

16. In apparatus of the class described, in combination, a frame comprising a pair of longitudinally disposed substantially parallel members, a hollow shaft mounted upon said frame members, a rotary member journaled upon said shaft, means mounted upon said rotary member adapted to receive cans, a valve seat mounted to turn with said rotary member, conduits leading from said valve seat to said can-receiving means, a valve mounted upon said shaft and co-acting with said valve seat to supply fluid to said conduits, a conduit leading through said hollow shaft to said valve, said valve being provided with a port extending throughout a portion of its circumference, means adapted to prevent rotation of said valve, means adapted to clamp cans within said can-receiving means, a fixed cam mounted upon said frame, and means operatively related to said cam adapted to actuate said clamping means.

17. In apparatus of the class described, in combination, a pair of members adapted to engage opposite ends of a can, one of said members being provided with means adapted to transmit a fluid to the can, an abutment adjacent which said last mentioned member is mounted, means connected with the other of said members, a wedge adjustably interposed between said means and said abutment, and means adapted to actuate said wedge to draw together said members.

In testimony whereof I affix my signature, in the presence of two witnesses.

CHARLES W. GRAHAM.

Witnesses:
WALTER C. HARRINGTON,
LEON D. TITUS.